(No Model.)
J. G. LEWIS.
GAS OR GASOLINE ENGINE.
No. 580,090. Patented Apr. 6, 1897.
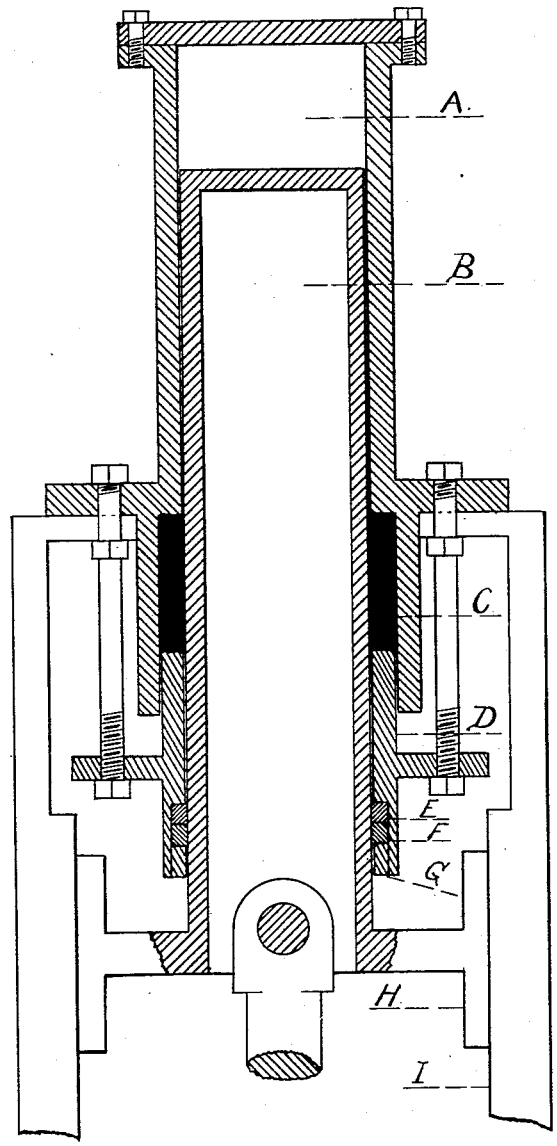
WITNESSES:
Charles Wesley Misner
Albert Rosenberg
INVENTOR.
James Garfield Lewis
BY
William W. Verney his ATTORNEY.
THE NORRIS PETERS CO., PHOTO-LITHO., WASHINGTON, D. C.

UNITED STATES PATENT OFFICE.

JAMES GARFIELD LEWIS, OF BALTIMORE, MARYLAND, ASSIGNOR, BY DIRECT AND MESNE ASSIGNMENTS, TO THE LEWIS GAS MOTOR COMPANY OF BALTIMORE CITY, OF MARYLAND.

GAS OR GASOLENE ENGINE.

SPECIFICATION forming part of Letters Patent No. 580,090, dated April 6, 1897.

Application filed July 29, 1895. Serial No. 557,471. (No model.)

*To all whom it may concern:*

Be it known that I, JAMES GARFIELD LEWIS, a citizen of the United States, residing at the city of Baltimore, in the State of Maryland, have invented certain new and useful Improvements in Gas or Gasolene Engines; and I do hereby declare that the following is a full, clear, and exact description of the invention, which will enable others skilled in the art to which it appertains to construct and use the same.

My invention relates to prime movers or engines of the internal-combustion type, and more particularly to that class of engines which use gas, gasolene, coal-oil, or other oil in any form in which it is burned or exploded in the cylinder.

Heretofore the usual practice in the above type of engines has been to construct them with a water-jacketed cylinder for the purpose of keeping the cylinder cold enough to permit of the working of a piston with packing-rings sufficiently tight to hold the compression and the pressure caused by the heated, burned, or exploded gases. For the old type to work successfully it was necessary that the cylinder should never acquire a temperature high enough to burn the lubricant on its walls. Otherwise the cylinder or piston and packing-rings would cut one another and become unserviceable. Cooling the cylinder, as will be seen, necessitates a great loss of heat energy of the engine.

The object of my invention is the improvement of such parts as are in or brought near to the heat-generating chamber of such engines to enable them to work and remain serviceable at the highest working temperature attained in gas-engine practice. To accomplish this, it is considered necessary that the piston shall not come in contact with any portion of the cylinder and that no lubricant shall be used in or allowed to get into the cylinder, as it would burn and likely form charcoal, which would probably cut the working parts. I attain these objects by the mechanism illustrated in the accompanying drawing, representing a section, in which—

A is a cylinder of an internal-combustion engine.

B is a piston reciprocating therein.

C is a soft packing or swab. D is a gland holding said soft packing or swab in place.

E and F are metallic packing-rings. G is a collar for the purpose of holding said packing-rings in place.

H is the cross-head, and I the guides.

Now, referring more particularly to the functions performed by C, D, E, and F, it is not desirable that the piston should come in contact with the cylinder-walls on the fire side of C. Therefore the cylinder is slightly larger than the piston. The piston is lubricated on the outside of C, either between C and E or outside altogether. The function of C is that of a scraper or swab to clean the piston before entering the packing after having been in contact with the fire of combustion of any deposit which may be thereon and to wipe the piston emerging from the packing of what remaining lubricant there may be on it before it enters the fire-chamber, thus preventing any charry deposit being formed on it at the instant of internal heat of combustion. This scraper or swab also performs the function of a fire-check to prevent the flame of combustion from reaching the packing.

C is made of asbestos, a substance upon which fire or heat has but little effect. In practice it is found that C becomes very hard on the fire side and soft and spongy on the lubricating side.

The rings E and F retain the gases of the high pressures of combustion, and they together with the gland form the guide for the piston.

The pressure of the cross-head is taken on the guide I.

Having thus described my invention, what I claim, and wish to secure by Letters Patent, is—

1. In a heat-engine, the combination with, a piston and a cylinder in which is secured stationary packing to fit the piston, of a soft swab on the heat side of the said packing operating on the working surface of the said piston, substantially as described.

2. In a heat-engine, the combination with, a piston and a cylinder and suitable packing, of means for cleaning the working surface brought into contact with the said packing independent of and on the heat side of the said packing, substantially as described.

3. In a heat-engine, the combination with, a cylinder having metallic packing secured near its open end and a piston working in said cylinder through said packing, of a soft or fibrous swab on the heat side of the said packing stationary in the said cylinder and operating on the said piston, substantially as described.

4. In a heat-engine, the combination with, a piston and a cylinder and suitable packing, of a swab fitting the surface upon which the said packing works on the heat side of the said packing, substantially as described.

5. In a heat-engine, the combination with, a cylinder, a piston and suitable packing and an independent swab located on the heat side of the said packing, of means for adjusting the said swab, substantially as described.

6. In a heat-engine, the combination with, a cylinder in which gases are burned and a piston working in said cylinder and packing through which said piston works, of a swab on the heat side of the said packing and through which the said piston works thereby cleaning the piston before its entry into the heated gas and before its entry into the packing after having been in contact with the heated gas, substantially as described.

7. In a heat-engine, the combination with, a cylinder A and a piston B working therein and a swab C around said piston stationary in said cylinder, of a gland D holding said swab in position and in which is located packing E F operating on said piston, substantially as described.

JAMES GARFIELD LEWIS.

Witnesses:
JOHN NELSON MARQUETTE,
CHARLES SENNER.